United States Patent [19]
Blank et al.

[11] Patent Number: 5,846,897
[45] Date of Patent: Dec. 8, 1998

[54] ZIRCONIUM URETHANE CATALYSTS

[75] Inventors: Werner Blank, Wilton; Zhiqiang Alex He, Ridgefield; Marie Emmanuelle Picci; John James Florio, both of Norwalk, all of Conn.

[73] Assignee: King Industries, Inc., Norwalk, Conn.

[21] Appl. No.: 820,120

[22] Filed: Mar. 19, 1997

[51] Int. Cl.$^6$ ..................................................... B01J 31/22
[52] U.S. Cl. ........................... 502/150; 502/152; 502/161; 502/170; 502/172; 252/182.2; 252/182.25; 252/182.26
[58] Field of Search ..................................... 502/150, 152, 502/161, 170, 172; 427/255.3; 252/182.2, 182.25, 182.26

[56] References Cited

U.S. PATENT DOCUMENTS

| | | | |
|---|---|---|---|
| 4,202,990 | 5/1980 | Murakami et al. | 560/217 |
| 5,306,759 | 4/1994 | Sakagami et al. | 524/379 |
| 5,372,850 | 12/1994 | Uchikawa et al. | 427/255.3 |
| 5,496,597 | 3/1996 | Soininen et al. | 427/126.3 |

FOREIGN PATENT DOCUMENTS

| | | |
|---|---|---|
| 869988 | 6/1961 | United Kingdom . |
| 890280 | 2/1962 | United Kingdom . |
| 908949 | 10/1992 | United Kingdom . |

OTHER PUBLICATIONS

Organic Coatings Science technology, vol. 1, Wiley Interscience Co., pp. 188–211 (no month), 1992.

*Proceedings of Water Borne and High SolidsCoatings Symposium,* Feb. 25–27, 1987, New Orleans, at p. 460.

B.D. Nahlovsky and G.A. Zimmerman, *Int. Jahrestag. Fraunhofer—Inst. Treib–Explosivst.,* 18th (Technol. Energ. Mater.), 39:1–12. (1987) (no month).

R.C. Fay in the Chapter on Zirconium and Hafnium, in Geoffrey Wikinson ed., *Comprehensive Coordination Chemistry,* vol. 3, p. 363, Pergamon Press, (1987). (no month available).

*Primary Examiner*—Shrive Beck
*Assistant Examiner*—Timothy Meeks
*Attorney, Agent, or Firm*—Morgan & Finnegan LLP

[57] ABSTRACT

The present invention is directed to novel metal organocomplexes as catalysts for the reaction of compounds with isocyanate and hydroxy functional groups to form urethane and/or polyurethane and the process employing such catalysts. More particularly, the present invention is directed to novel complexes of zirconium or hafnium with diketones or alkylacetoacetoates. These novel catalysts are useful for the production of urethanes and polyurethanes which are important in many industrial applications, such as: coatings, foams, adhesives, sealants, and reaction injection molding (RIM) plastics.

6 Claims, No Drawings

ZIRCONIUM URETHANE CATALYSTS

FIELD OF INVENTION

The present invention is directed to novel metal organo-complexes as catalysts for the reaction of compounds with isocyanate and hydroxy functional groups to form urethane and/or polyurethane and the process employing such catalysts. More particularly, the present invention is directed to novel complexes of zirconium or hafnium wherein one of the ligands is a diketone with at least 7 carbons in the hydrocarbon backbone chain.

These novel catalysts are useful for the production of urethanes and polyurethanes which are important in many industrial applications, such as: coatings, foams, adhesives, sealants, and reaction injection molding (RIM) plastics.

BACKGROUND OF THE INVENTION

The reaction of isocyanate and hydroxy compounds to form urethanes is the basis for the production of polyurethanes. Metal compounds (e.g., tin, zinc and bismuth compounds) and tertiary amines have been known to catalyze the reaction of isocyanate and hydroxyl groups to form urethane. See, *Proceedings of Water Borne and High Solids Coatings Symposium*, Feb. 25–27, 1987, New Orleans, at Page 460. Compounds useful for the isocyanate-hydroxy reaction are also referred to as urethane catalysts. At present, the commercially available catalysts used in this reaction are organotin compounds (e.g., dibutyltin dilaurate and dibutyltin diacetate), zinc carboxylates, bismuth carboxylates, organomercury compounds and tertiary amines.

There are several problems with these commercially available catalysts. When they are used in the process for polyurethane coatings, the cure of the coatings under high humidity or at low temperature conditions is not satisfactory. They catalyze the undesirable side reaction of isocyanate with water to form amines and carbon dioxide. The carbon dioxide may cause blisters in the coating and the amines react with isocyanates resulting in low gloss coatings. Moreover, the cure rate at low temperatures is too slow. The commercially available catalysts also catalyze the degradation of the resulting polymer product. Furthermore, several of the commercially available urethane catalysts, particularly those containing heavy metals and tertiary amines, are highly toxic and are environmentally objectionable.

The testing of zirconium acetylacetonate and zirconium tetra-3-cyanopentanedionate, as catalysts for the isocyanate-hydroxy reaction have been described in GB Patents 908949, 890,280 and 869988. Subsequent testing by others, however, has shown that zirconium acetylacetonate is a poor catalyst for the urethane reaction. B. D. Nahlovsky and G. A. Zimmerman, *Int. Jahrestag. Fraunhofer—Inst. Treib-Explosivst.*, 18th (Technol. Energ. Mater.), 39:1–12, reported that the catalytic efficiency of zirconium acetylacetonate for the isocyanate-hydrox reaction to form urethane is low. The solubility of zirconium acetylacetonate and zirconium tetra-3-cyanopentanedionate in solvents commonly used in the production of coatings is poor. Examples of such solvents include esters ketones, glycolesters and aromatic hydrocarbons, such as: butyl acetate, methyl isoamyl ketone, 2-methoxy propylacetate, xylene and toluene. Because of the low catalytic efficiency and the poor solvent solubility, the use of these compounds as catalysts in processes involving urethane or polyurethanes have been limited.

Further testing using zirconium acetylacetonate in our laboratory has shown that zirconium compounds disclosed in the prior art, will only catalyze the isocyanate-hydroxy reaction when carried out in a closed system, i.e., in a closed pot. This is impractical for many of the polyurethane applications. The zirconium diketonates of the prior art failed as catalysts when the reaction is carried out in the open atmosphere, unless there is present a large excess of the corresponding diketone. For zirconium acetylacetonate, the presence of over 1000 to 1 mole ratio of 2,4-pentanedione to zirconium acetylacetonate is required. However, 2,4-pentanedione and other similar diketones are volatile solvents which, when used in an open vessel, pollute the air, and pose both an environmental and a fire hazard. In addition, the presence of the free diketone causes discoloration of the catalyst, resulting in an undesirable, discolored product.

The objective of this invention is to develop catalysts with high catalytic efficiency for the isocyanate-hydroxy reaction to form urethane and/or polyurethane.

A second objective of the present invention is to develop catalysts which provide improved cure at a lower temperature and is less sensitive to the presence of water.

A further objective of the present invention is to develop metal diketonates as catalysts which would not be deactivated when the reaction is exposed to the atmosphere nor require an excess of free diketone.

Another objective of the present invention is to provide catalysts for the isocyanate-hydroxy reaction which would not catalyze the undesired side reaction of water with isocyanates or the undesired degradation of the polyurethane.

SUMMARY OF THE INVENTION

This invention is directed to a catalyst for the isocyanate-hydroxy reaction having the chemical structure:

$$Me(X_1, X_2, X_3, X_4) \qquad (I)$$

wherein Me is zirconium (Zr) or hafnium (Hf) and $X_1$, $X_2$, $X_3$, and $X_4$, are the same or different and selected from the group consisting of a diketone and an alkylacetoacetate having the structures:

$$R_1COCH_2COR_2 \text{ and} \qquad (II)$$

$$R_1OCOCH_2COR_2 \qquad (III)$$

wherein each of $R_1$ and $R_2$ is a branched or linear $C_1$–$C_{20}$ hydrocarbon and at least one of $X_1$, $X_2$, $X_3$, and $X_4$ is a diketone with structure (II) wherein the total number of carbons in $R_1+R_2$ is at least 4. That is, the number of carbons in the backbone of the hydrocarbon chain is at least 7. The preferred diketones are those containing a total number of carbons in $R_1+R_2$ of at least 5, i.e. the number of carbons in the hydrocarbon backbone is at least 8. Also preferred are metal complexes wherein all of the ligands, $X_1$, $X_2$, $X_3$, and $X_4$ are diketones with structure (II).

The catalyst may also be a mixture of zirconium or hafnium diketonates as defined above or a mixture of a diketonate and an alkylacetoacetate of zirconium or hafnium, with at least one of the the compounds in the mixture being a zirconium or hafnium diketonate complex wherein one of the four ligands in the complex is a diketone having at least 7 carbons in the hydrocarbon backbone of the molecule.

The catalyst may also be a blend of zirconium or hafnium pentaedionate or acetylacetonate with a diketone having at least 7 carbons in the hydrocarbon backbone of the molecule. This is because the ligands of the zirconium or hafnium complex readily exchange with the diketone of structure (II) to form the catalyst in situ.

DETAILED DESCRIPTION OF THE INVENTION

The catalyst for an isocyanate-hydroxy reaction to produce urethane or polyurethane comprise a metal organocomplex with the chemical structure:

$$Me(X_1, X_2, X_3, X_4) \tag{I}$$

wherein Me is zirconium (Zr) or hafnium (Hf) and $X_1$, $X_2$, $X_3$, and $X_4$, are the same or different selected from the group consisting of a diketone and an alkylacetoacetate having the structures:

$$R_1COCH_2COR_2 \quad \text{and} \tag{II}$$

$$R_1OCOCH_2COR_2 \tag{III}$$

wherein each of $R_1$ and $R_2$ is a branched or linear $C_1$–$C_{20}$ hydrocarbon and at least one of $X_1$, $X_2$, $X_3$, and $X_4$ is a diketone with structure (II) wherein the total number of carbons in $R_1+R_2$ is at least 4. That is, the number of carbons in the backbone of the diketone is at least 7. The preferred diketones are those wherein the total number of carbons in $R_1+R_2$ is at least 5, i.e., with at least 8 carbons in the backbone of the molecule. Also preferred are metal complexes wherein all of the ligands, $X_1$, $X_2$, $X_3$, and $X_4$ are diketonates.

The catalyst may also be a mixture of zirconium or hafnium diketonates or a mixture of diketonate and alkylacetoacetate of zirconium or hafnium, with at least one of the the compounds in the mixture being a zirconium or hafnium diketonate complex wherein one of the four ligands in the complex has at least 7 carbons in the hydrocarbon backbone.

The catalyst may also be a blend of zirconium or hafnium pentanedionate or acetylacetonate with a diketone having at least 7 carbons in the hydrocarbon backbone of the molecule.

The metal complexes of this invention can be synthesized via the known ligand exchange reactions of zirconium or hafnium compounds with the desired diketone. These reactions are described by R. C. Fay in the chapter on zirconium and hafnium, in Geoffrey Wikinson ed., *Comprehensive Coordination Chemistry*, Vol.3, page 363, Pergamon Press, (1987).

The metal complexes with mixed ligands can be prepared by charging the starting zirconium compound into a solution containing the desired ligand(s) at specified mole ratios. The ligand exchange reaction is facile and can be accomplished by blending the starting zirconium or hafnium compound and the desired ligand as a chelating agent at an ambient or slightly elevated temperature. This blending can be carried out in a solvent such as a polyol, e.g. propylene glycol, dipropylene glycol, 1,3-butylene glycol, 1,6-hexane diol, polypropylene glycol (MW 400–2600), polytetramethylene glycol (MW 200–1000), dimethoxy-dipropylene glycol or other diluents, such as xylene, methyl iso-amyl ketone, dibutylether, butoxy/propoxy/ethoxy polypropylene ethylene glycol ether.

Typical starting zirconium or hafnium compounds include the chloride, oxychloride, alkoxide, carbonate, and acetylacetonate of zirconium or hafnium. Typical ligands or chelating agents of Structure II include: 6-methyl-2,4-heptanedione (wherein $R_1$=C1 and $R_2$=C4), 2,2,6,6-tetramethyl-3,5-heptanedione (wherein $R_1$=C4 and $R_2$=C4), n-valerylacetone (wherein $R_1$=C1 and $R_2$=C4), n-hexanoylacetone (wherein $R_1$=C1 and $R_2$=C5), n-octanoylacetone (wherein $R_1$=C1 and $R_2$=C7), n-nonanoylacetone($R_1$=C1, $R_2$=C8), n-decanoylacetone (wherein $R_1$=C1 and $R_2$=C11) and the like.

The isocyanates useful in this invention are aliphatic, aromatic isocyanates or polyisocyanates or resins with terminal isocyanate groups. The resins may be monomeric or polymeric isocyanates. Typical monomeric isocyanates include: toluene diisocyanate (TDI), diphenylmethane diisocyanate (MDI), 1,6-hexamethylene diisocyanate (HDI), phenyl isocyanate, 4,4'-dicyclohexylmethane diisocyanate, isophorone diisocyanate(IPDI), meta-tetramethylxylene diisocyanate (TMXDI), nonanetriisocyanate (TTI) or vinyl isocyanate, or the like. The above monomeric isocyanates are those which are more commonly used and is not meant to be exclusive. The polymeric polyisocyanates useful in the invention are isocyanurate, allophanate, or biuret compounds and polyurethane products derived from the monomeric diisocyanates as listed hereinablove. Also useful are addition products of monomeric isocyanates with polyester and polyether polyols containing terminal isocyanate groups.

The polyols or resins with hydroxy functional groups useful in this invention comprise monomeric compounds or polymeric compositions containing at least two hydroxy groups per molecule. The molecular weight of the hydroxy containing compounds useful in this invention ranges from 62 to 1,000,000; the preferred range for polyols being between 300 to 2000 when used in solvent borne high solids coatings. Typically, the hydroxyl number of the hydroxy containing resin can be from 10–1000. Optionally, the polyol may contain other functional groups such as carboxyl, amino, urea, carbamate, amide and epoxy groups. The polyol, a blend of polyols or a combination of polymeric polyols and monomeric diols may be employed in a solvent free system, or as a solution in an organic solvent, or as a dispersion/emulsion in water. Typical examples include: polyether polyol, polyester polyol, acrylic polyol, alkyd resin, polyurethane polyol, and the like.

The polyether polyols are the reaction products of ethylene or propylene oxide or tetrahydrofuran with diols or polyols. Polyethers derived from natural products such as cellulose and synthetic epoxy resins may also be used in this invention. Typical polyester polyols are prepared by the reaction of diols, triols or other polyols with di- or polybasic acids. Alkyds with hydroxy functional groups are prepared in a similar process except that mono functional fatty acids may be included. Acrylic polyols are the polymerization products of an ester of acrylic or methacrylic acid with hydroxy containing monomers such as hydroxyethyl, hydroxypropyl or hydroxybutyl ester of acrylic or methacrylic acid. These acrylic polymers can also contain other vinyl monomers such as styrene, acrylonitrile vinyl chloride and others. In addition, polyurethane polyols are also useful in this invention. These are the reaction products of polyether or polyester polyols with diisocyanates.

The polyols listed above are illustrative and are not meant to limit the scope of the invention.

Typically the polyols are either synthesized in bulk in the absence of a solvent or are prepared in the presence of a diluent or by emulsion polymerization in water. Alternatively, they may be prepared in bulk or in a solvent and then dispersed in water. For a description of the methods of preparing polyols see *Organic Coatings Science Technology*, vol. 1, Wiley-Interscience Co., 1992.

The concentration of the catalysts used is generally from 0.0001 wt % to 5 wt % on total resin solids. Typically, the concentration of catalysts used is between 0.001 to 0.1 wt % based on the total amount of polyol and polyisocyanate, also known as binders. The catalyst concentration used is generally a compromise between potlife of the formulation and the required cure rate.

The catalyst of the present invention is particularly suitable for applications where exceptionally fast cure is required. For example, the catalysts of the present invention is particularly useful in plural component spray gun applications wherein the catalyst is added to one of the components and the polyol and the isocyanate is mixed in situ in the spray gun. These are important in applications for roof or floor coatings, where the person applying the coating would be able to walk on the freshly applied coating a few minutes after the coating has been applied. Good cure rate is also required for coatings applied at a low temperature or in the presence of moisture, conditions where the catalyst of this invention excels.

Reactive injection molding (RIM) is another area where fast cure is essential. The reactants and catalyst are injected concurrently into a mold, and mixing is achieved during injection. In this application, fast reaction is essential to permit a short cycle time.

The ratio of NCO/OH in the formulation is in the range of 0.1–10.0 to 1, preferably 0.5–2.0 to 1 depending upon the end use. For a typical high solids application, the preferred isocyanate to hydroxy ratio is usually 1.0:1 to 1.1:1. For many water-borne applications, an excess of isocyanate is required. Typically the ratio for such applications is 1.5:1 to 2.0:1.

The catalyst formulation can be solvent borne, high solids, 100% solids or dispersable in water. Other additives which may be utilized in the formulation to impart desired properties for specific end uses. For example, 2,4-pentanedione, can be used together with the catalyst to extend pot life.

For most isocyanate crosslinked coatings, solvents which are free of hydroxy groups and water are used. Typical solvents are esters, ketones, ethers and aliphatic or aromatic hydrocarbons.

The catalytic efficiency of the metal complexes of this invention is determined by measuring the drying time of the coated film or by a gel test. For drying time measurement, the liquid formulation containing polyisocyanate, polyol and catalyst was cast on a metal panel and the surface dry time and the through dry time were recorded with a circular Gardner Drying Time Recorder. For the gel test, liquid polyisocyanate, liquid polyol solution and catalyst were mixed thoroughly at room temperature. The time needed from mixing the liquid components to forming a gel (the time interval when the liquid formulation becomes non-flowable) was recorded as gel time.

The catalysts of this invention exhibit excellent catalytic efficiency, measured as drying time of the coated film and/or gel time, for the isocyanate-hydroxy reaction compared to zirconium diketonates reported in prior art and commercially available organotin catalysts, especially at low temperatures. For example, in a coating formulation with polyisocyanate and acrylic polyol, the cure rate of a formulation with zirconium tetra 6-methyl-2,4-heptanedionate as a catalyst is more than 5 times faster than the formulation with commercial dibutyltin dilaurate at the same metal concentration.

This is surprising. Zirconium tetraacetylacetonate described in the prior art (wherein $X_1=X_2=X_3=X_4$ and $R_1=R_2=CH_3$), does not function as an effective curing catalyst. Even though the gel time is shorter than the uncatalyzed process, it is still too long. Further, exposure to atmosphere deactivates zirconium tetraacetylacetonate. However, when one of the ligands in zirconium tetraacetylacetonate is replaced with a diketonate with at least 7 carbons in the backbone, or when zirconium tetraacetylacetonate is in a mixture with a metal complex of the present invention, or when zirconium tetraacetylacetonate in mixed with a diketone with at least 7 carbons in the hydrocarbon backbone, an effective catalyst is obtained.

The catalyst of this invention also preferentially catalyze the isocyanate-hydroxy reaction over the isocyanate-water reaction. Organo tin does not exhibit this preferential catalysis, and also catalyze the isocyanate-water reaction, which leads to the formation of carbon dioxide and gassing. For example, to prepare a polyurethane coating with exclusive carbamate linkages, a coating formulation containing HDI based aliphatic isocyanate and a polyurethane diol with beta-carbamate was formulated. When the metal complex of the present invention was used as the catalysts, a hard glossy film was obtained. Whereas, with dibutyltin dilaurate as the catalyst, a hazy film was obtained. This is due to the competing reaction of isocyanate with moisture in the air.

Furthermore, it is known that commercial organotin urethane catalysts will affect the durability of the final product. This is due to the catalytic effect of organotin catalysts on the degradation of the polymer product. The metal complexes of the present invention shows less of a catalytic effect on the degradation of the polymer than the tin urethane catalysts. For a solution with polyester resin, water and catalysts, the degradation rate of polyester with the catalyst of this invention is 5 times slower than a typical tin catalyst.

To avoid pigment adsorption or interference from other components which may deactivate the catalyst, it would be an advantage if the catalysts can be pre-blended with the isocyanate component in a two component system. However, a number of urethane catalysts also catalyze the dimerization or trimerization reactions of isocyanate and cannnot be pre-blended with the isocyanate component. A solution of a polyisocyanate with the catalysts of this invention showed good compatibility and stability.

The following examples are provided to illustrate the present invention and are not meant to limit the scope thereof.

Example 1

Catalyst Evaluation

A liquid coating formulation containing polyisocyanate, polyol and the catalyst as shown in Table 1 was prepared. The formulation was applied to an iron phosphate treated cold roll steel (Bo 1000) panel via a draw down bar to provide a wet film thickness of 1.7 mils. The panels were allowed to cure at room temperature and at 5° C. at a relative humidity of 50–60%. The cure rate for formulations wherein zirconium complexes were used as the catalyst is presented in Table IIA. This can be compared with the formulation wherein dibutyltin dilaurate was used as the catalyst shown in Table IIB. The drying time of the coated film was recorded using a Gardner Circular Drying Time Recorder with a Teflon stylus. The Teflon stylus moves at a constant speed on the top of the film after the film was applied. The time between applying the film and when the Teflon stylus no longer leaves a clear channel, but begins to rupture the drying film is recorded as surface dry time. The time between applying the film and when the stylus no longer ruptures or dents the film is recorded as through dry time. The time between mixing isocyanate and polyol solutions and the moment that the liquid becomes a non-flowable gel is recorded as gel time. The solubility of each catalyst in the formulation was noted. The results presented in Tables IIA & IIB showed that the catalysts of this invention provided much improved catalytic efficiency and are more soluble in the solvent, methyl amyl ketone, than the catalysts of the prior art.

TABLE I

Polyurethane Formulation Used In Cure Rate Test

| Material | Parts by Weight |
| --- | --- |
| Part A: | |
| Acrylic polyol solution[a] | 58.8 |
| Methyl amyl ketone | |
| (solvent) | 24.8 |
| Part B: | |
| Aliphatic polyisocyanate[b] | 16.4 |
| Metal catalyst as wt % metal based on total resin solids | 0.0046 |
| Formulation parameters | |
| Total resin solids by weight | 58.7% |
| NCO/OH ratio | 1.2 |

[a]Joncryl SCX-906 Acrylic polyol: 72 wt % in methyl amyl ketone with a hydroxy equivalent weight on solids of 600 (SC Johnson Polymer, Racine, WI).
[b]Desmodur N-3300 Polyisocyanate (isocyanurate of hexamethylene diisocyanate), 100% solids, NCO-equivalent weight of 194 (Bayer Corporation, Pittsburgh, PA).

TABLE IIA

Cure Rate of Zirconium Complexes (Room Temperature: 22–25° C.)

| Zr Catalyst (moles of chelating agent) | Wt % Me in complex | Gel time MIN | Surface dry time MIN | Through dry time MIN | Solubility in Formulation |
| --- | --- | --- | --- | --- | --- |
| TMHD (4) | 11.1 | 20 | 40 | 120 | good |
| MHD (4) | 13.9 | 10 | 15 | 20 | excellent |
| MHD (2) & ACAC (2) | 16.0 | 20 | 75 | 180–240 | good |
| DMHFOD (4) | 7.2 | 240 | 120 | 240–300 | good |
| MHD (2) & DMHFOD (2) | 9.5 | 25 | 20 | 120–180 | excellent |
| MHD (3) butanol (1) | 15.5 | 60 | 150 | 300 | excellent |
| MHD (2) & ethylacetoacetate (2) | 14.4 | 120–180 | 150 | 360 | excellent |
| MHD (3) & ACP (1) | 14.0 | 25 | 30 | 60 | good |
| DBM (2) & MHD (2) | 11.1 | 20 | 45 | 120–180 | good |
| Zr acac/MHD (1:1 by weight)* | | 15 | 10 | 15 | good |

TABLE IIB

Comparative Examples

| Zr Catalyst (moles of chelating agent) | Wt % Me in complex | Gel time MIN | Surface dry time MIN | Through dry time MIN | solubility in formulation |
| --- | --- | --- | --- | --- | --- |
| ACAC (4) | 18.7 | 90 | >720 | >1440 | poor |
| Zr Butoxide | 23.8 | >720 | >720 | >720 | good |
| Ethylacetoacetate (4) | 115.0 | >720 | >720 | >720 | good |
| cyclopetadiene (2) & chloride (2) | 31.2 | >720 | >720 | >720 | good |
| DBM (4) | 9.3 | 35 | 80 | 180 | poor |
| 3-Ethyl-acetylacetone (4) | 15.2 | >720 | >720 | >720 | poor |
| 1,1,1-trifloro-acetylacetone (4) | 13.0 | 30 | >720 | >720 | poor |
| DBM (2) BAC (2) | 10.6 | 40 | 70 | 180 | poor |
| BAC (4) | 12.4 | >720 | >720 | >720 | poor |
| Triacetyl methane (4) | 13.9 | 90 | >720 | >720 | good |

TABLE IIB-continued

Comparative Examples

| Zr Catalyst (moles of chelating agent) | Wt % Me in complex | Gel time MIN | Surface dry time MIN | Through dry time MIN | solubility in formulation |
|---|---|---|---|---|---|
| Dibutyltin dilaurate | 18.8 | 120 | 90 | 180–240 | excellent |
| no catalyst | — | >720 | >720 | >720 | |

Key for Tables IIA & IIB:
ACAC: 2,4-Pentanedione
ACP: 2-acetocyclopetanone
BAC: Benzoylacetone
DBM: dibenzoylmethane
DMHFOD: 2,2-dimethyl-6,6,7,7,8,8-heptafluoro-3,5-octanedione
MHD: 6-methyl-2,4-heptanedione
TMHD: 2,2,6,6-tetra-methyl-3,5-heptanedione
*Blend of zirconium acetylacetonate with 6-methyl-2,4-heptanedione

Example 2

Catalyst Efficiency

The cure rate of zirconium tetra 6-methyl-2,4-heptane-dionate was compared with dibutyltin dilaurate in an aromatic polyisocyanate and polyether polyol system. In this experiment, polyisocyanate, polyether polyol and the metal catalyst were mixed thoroughly. The time from mixing to the formation of gel, i.e., when the liquid formulation became non-flowable, was recorded as gel time. The results in Table 3 showed that the catalytic efficiency of the catalysts of this invention is significantly higher than that of the commercially available tin catalyst.

TABLE III

Comparison of Gel Time For Reaction of Aromatic Polyisocyanate and Polyether Polyol Formulation parameters:

NCO/OH = 1.04
0.01% metal on total resin solids
Gel time Comparison (Room temperature, 22–25° C.)

| polyether polyol | $Zr(MHD)_4{}^a$ | $DBTDL^b$ | NO CATALYST |
|---|---|---|---|
| Polypropylene glycol PPG-425 OH eq wt 224.4 | 50 min | >8 hours | 10–20 hours |
| Polypropylene glycol PPG-1025 OH eq wt 522.34 | 150 mim | 4 hours | >48 hours |
| Polyethylene glycol 400 OH eq wt 200 | 4 min | 3 hours | >4 hours |

$^a$Zr(MHD)$_4$ = Zirconium tetra-6-methyl-2,4-heptanedione
$^b$DBTDL = dibutyltin dilaurate
Aromatic polymeric isocyanate based on diphenylmethane 4,4'-diisocyanate, 100% solids, 130 equivalent weight (Bayer Corporation, Pittsburgh, PA).
Polypropylene glycol (Arco Chemical Company, Newtown Square, PA).
Polyethylene glycol, Union Carbide Corporation, 39 Old Ridgebury Road, Danbury, CT 06817-0001.

Example 3

Efficiency of Catalyst for the Reaction of Aliphatic Isocyanate and Polyurethane Diol In this experiment, aliphatic polyisocyanate was reacted with a polyurethanediol (bis β-hydroxypropyl carbamate) in the presence of catalysts. The appearance of each of the resulting coating film was noted. The coating film cured with dibutyltin dilaurate appeared hazy. It is believed that the haziness resulted from the reaction of isocyanate with moisture. On the other hand, the coating film cured with zirconium tetra 6-methyl-2,4-heptanedionate ($Zr(MHD)_4$) is clear and glossy.

TABLE IV

Comparison of Film Properties

Formulation: NCO/OH = 1.0, total resin solids by weight: 80%

| Material | Parts by Weight |
|---|---|
| Part A: | |
| Urethanediol$^a$ | 36.1 |
| Methyl ethyl ketone solvent | 15.2 |
| Part B: | |
| Polyisocyanurate$^b$ | 48.7 |
| Metal catalyst* | varied |

*Catalyst was added at a concentration of 0.01 wt % metal on total resin solids.
$^a$K-Flex UD-320-100 Polyurethanediol: 100% solids, hydroxy number: 350 (King Industries, Norwalk, CT).
$^b$Desmodur N-3390 Polyiscyanate based on isocyanurate of hexamethylene diisoayanate, 90% in butyl aaetate, 216 equivalent weight. Bayer Corporation, 100 Bayer Road, Pittsburgh, PA. 15205-9741.

Cure Rate and Film Properties (Room temperature)

| Catalyst | $Zr(MHD)_4$ | DBTDL* |
|---|---|---|
| Surface dry | 2 hours | 24 hours |
| Gloss | | |
| 60° | 95 | 25 |
| 20° | 75 | 9 |

$Zr(MHD)_4$ = Zirconium tetra-6-methyl1-2,4-heptanedione,
*DBTDL = = dibutyltin dilaurate
*Comparative example

Example 4

Effect of Catalyst on the Degradation of Polymer

It is a known that polyester-urethane resins lose strength on exposure to water and is a problem. The potential for increased degradation of resins containing polyester groups in the presence of a catalyst has been of concern. The degradation is due to the hydrolysis of polyesters groups in the polymer to form carboxyl groups. The degradation can be monitored by detemining the change in acid number of the resin composition.

To test the catalytic effect on the degradation of polyester containing resins, formulations were prepared wherein each catalyst was mixed together with a polyester polyol, water, and methyl ethyl ketone and maintained at 50° C. Periodically, alliquots were withdrawn and the acid number of each formulation was monitored by titration. A higher acid number indicates a higher degree of degradation.

The results of using Zirconium tetra-6-methylheptanedione, dibutyltin diacetate and no catalyst are shown in Table V. The results illustrate an advantage of the catalysts of this invention. These catalysts showed no effect on the degradation of polyester polyol as compared to the uncatalyzed formulation. Whereas, the formulation with the organotin catalyst showed marked degradation of the polyester polyol.

TABLE V

Change in Acid Number of a Polyester/H2O/Catalyst Mixture vs. aged time

| Formulation: | Methyl ethyl ketone | | | | 31.55% |
|---|---|---|---|---|---|
| Polyester polyol* | | | | | 59.20% |
| water | | | | | 9.25% |
| catalyst | | | | | 0.01% metal on total resin solids (TRS) |
| catalyst | t = 0 | 2 weeks | 4 weeks | 8 weeks | 13 weeks |
| Zr(MHD)$_4$[a] | 0.63 | 0.74 | 0.94 | 1.25 | 1.96 |
| DBTDAc[b] | 0.63 | 2.78 | 3.97 | 6.56 | 9.85 |
| Control[c] | 0.63 | 0.71 | 0.94 | 1.49 | 2.30 |

[a]Zr(MHD)$_4$ = Zirconium tetra-6-methyl-2,4-heptanedione
[b]DBTDAc = dibutyltin diacetate
[c]Control = no catalyst
*K-FLEX 188 Polyester resin, 100% solids, OH number: 230 acid number: <1.0 (King Industries, Norwalk CT)

We claim:

1. An isocyanate-hydroxy reaction catalyst composition comprising a mixture of tetrakis-(2,4-pentanedionato) zirconium and a compound selected from the group consisting of a diketone having the structure:

$$R_1COCH_2COR_2 \qquad (II)$$

and an alkylacetoacetate having the structure:

$$R_1OCOCH_2COR_2 \qquad (III)$$

wherein each of $R_1$ and $R_2$ is a branched or linear $C_1$–$C_{20}$ hydrocarbon and the total number of carbons in $R_1+R_2$ is at least 4.

2. An isocyanate-hydroxy reaction catalyst composition comprising a mixture, wherein each component of the mixture is a catalyst of claim 1, and wherein Me ($X_1$, $X_2$, $X_3$, $X_4$) of each component in the mixture is different.

3. A composition comprising a polyol, a polyisocyanate and a catalyst of claim 1.

4. A composition according to claim 3 wherein the polyol is selected from the group consisting hydroxy containing compounds having a molecular weight in the range of between 62 to 1,000,000 and the polyisocyanate is selected from the group consisting diisocyante, isocyanurate, allophanate, biuret compounds and polyurethane products derived from monomeric diisocyanato compounds.

5. A composition according to claim 4 wherein the molecular weight of the hydroxy containing compound is in the range of between 400 to 2,000.

6. A composition according to claim 3 wherein the polyol further contain carboxyl, amine, carbamate, amide and epoxy functional groups.

* * * * *